(12) United States Patent
Peterson et al.

(10) Patent No.: US 9,596,471 B2
(45) Date of Patent: Mar. 14, 2017

(54) BIT RATE MODIFICATION BASED ON AN AMBIENT INTERFERENCE LEVEL

(71) Applicant: LENOVO (Singapore) PTE, LTD., New Tech Park (SG)

(72) Inventors: Nathan J. Peterson, Durham, NC (US); Amy Leigh Rose, Chapel Hill, NC (US); Grigori Zaitsev, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 304 days.

(21) Appl. No.: 14/315,135

(22) Filed: Jun. 25, 2014

(65) Prior Publication Data

US 2015/0379997 A1 Dec. 31, 2015

(51) Int. Cl.
| | |
|---|---|
| *H04N 7/12* | (2006.01) |
| *H04N 19/115* | (2014.01) |
| *H04N 19/139* | (2014.01) |
| *G10L 25/48* | (2013.01) |
| *H04N 19/172* | (2014.01) |
| *H04N 19/136* | (2014.01) |
| *H04N 19/154* | (2014.01) |
| *G10L 21/0216* | (2013.01) |

(52) U.S. Cl.
CPC ............ *H04N 19/115* (2014.11); *G10L 25/48* (2013.01); *H04N 19/136* (2014.11); *H04N 19/139* (2014.11); *H04N 19/154* (2014.11); *H04N 19/172* (2014.11); *G10L 21/0216* (2013.01)

(58) Field of Classification Search
IPC ..................................................... H04N 19/115
See application file for complete search history.

(56) References Cited

U.S. PATENT DOCUMENTS

| | | | |
|---|---|---|---|
| 2002/0186660 A1* | 12/2002 | Bahadiroglu | H04L 29/06 370/248 |
| 2009/0086860 A1* | 4/2009 | Higashinaka | H04B 7/08 375/346 |
| 2010/0030303 A1* | 2/2010 | Haubrich | A61N 1/08 607/60 |
| 2010/0078563 A1* | 4/2010 | Haveri | G01J 3/427 250/339.06 |
| 2012/0147274 A1* | 6/2012 | Hassan | H04L 1/0033 348/729 |
| 2014/0106801 A1* | 4/2014 | Tamizhmani | H04W 24/02 455/501 |

* cited by examiner

*Primary Examiner* — Tracy Y Li
(74) *Attorney, Agent, or Firm* — Kunzler Law Group (57) ABSTRACT

For bit rate adjustment based on ambient interference levels, an apparatus determines an ambient interference level of ambient interference. In addition, the apparatus modifies a bit rate of a lossy compressed data stream in response to the ambient interference level.

18 Claims, 7 Drawing Sheets

BIT RATE MODIFICATION BASED ON AN AMBIENT INTERFERENCE LEVEL

BACKGROUND

Field

The subject matter disclosed herein relates to bit rate modification and more particularly relates to bit rate modification based on ambient interference levels.

Description of the Related Art

Data streams carrying audio and/or video information are often compressed to reduce the bandwidth requirements for the data streams. Less compression results in a higher quality image, but also in higher bandwidth consumption.

BRIEF SUMMARY

An apparatus for bit rate adjustment based on ambient interference levels is disclosed. The apparatus includes a communication device with a processor and memory that stores code executable by the processor. The code determines an ambient interference level of ambient interference. In addition, the code modifies a bit rate of a lossy compressed data stream in response to the ambient interference level. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
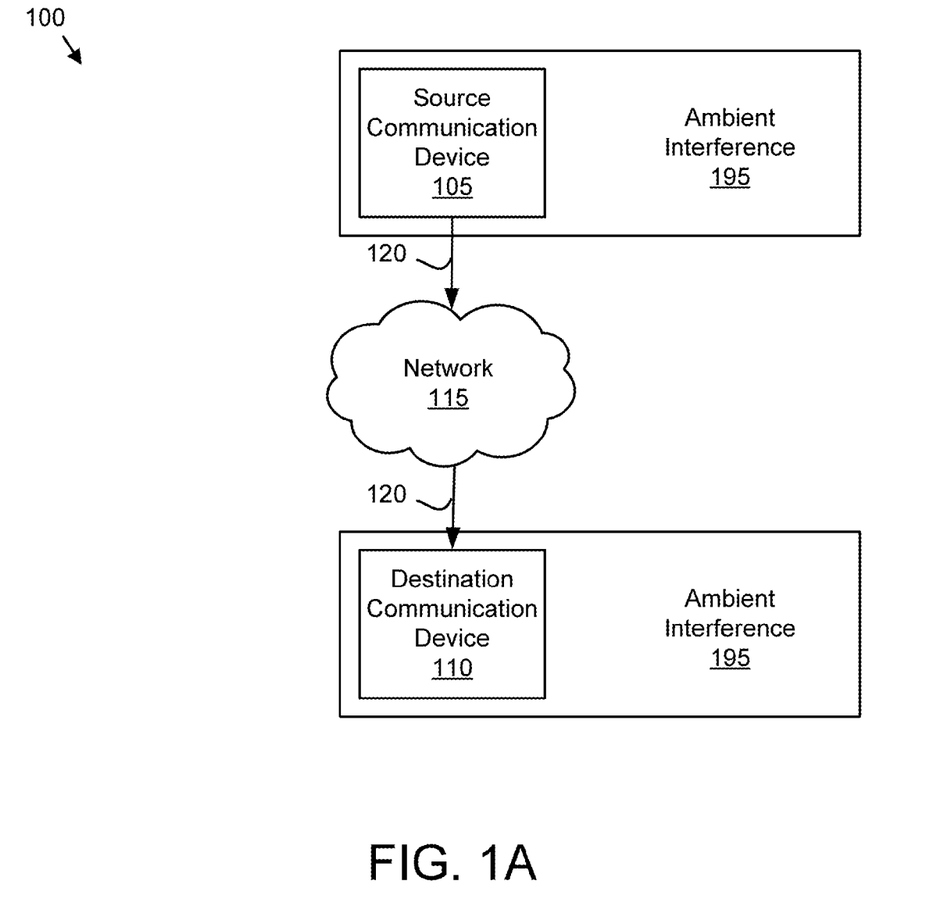
FIG. 1A is a schematic block diagram illustrating one embodiment of a communication system.

FIG. 1A is a schematic block diagram illustrating one embodiment of a communication system 100. The system 100 includes a source communication device 105, a destination communication device 110, and a network 115. The source communication device 105 communicates a lossy compressed data stream 120 through the network 115 to the destination communication device 110.

The network 115 maybe the Internet, a mobile telephone network, a wide-area network, a local area network, a wireless network, or combinations thereof. The source communication device 105 may compress the data stream 120 for transmission over the network 115 to the destination communication device 110. As used herein, a lossy compressed data stream 120 loses some image details when decompressed. The source communication device 105 may employ a lossy compression algorithm and/or other data reduction techniques to reduce a bit rate of the data stream 120 for transmission over the network 115.

At times the source communication device 105 may be exposed to ambient interference 195. In addition, the destination communication device 110 may also be exposed to ambient interference 195. The ambient interference 195 may be audio interference. For example, conversation, traffic, and other sounds near the source communication device 105 or destination communication device 110 may result in audio ambient interference 195.

Alternatively, the ambient interference 195 may be ambient light. For example, the destination communication device 110 may be exposed to bright lights, resulting in visual ambient interference 195. In a certain embodiment, the source communication device 105 may record a video image in very low ambient light, also resulting in visual ambient interference 195.

In one embodiment, the ambient interference 195 is motion of a video image captured by the source communication device 105. For example, if the field of view of the source communication device 105 is changing rapidly, the quality of the video image from the source communication device 105 may be low resulting in high ambient interference levels even if the video images are communicated with a high resolution. Alternatively, if the view angle of the destination communication device 110 is changing rapidly, the quality of the video image perceived by a user of the destination communication device 110 may be low resulting in high ambient interference levels even if the video images are communicated with the high resolution.

When an ambient interference level of the ambient interference 195 is high, the perceived quality of the uncompressed data from the lossy compressed data stream 120 at the destination communication device 110 may be low even if the bit rate of the data stream 120 is high. For example, if the ambient interference level around either the source communication device 105 and/or the destination communication device 110 is high because of audio ambient interference 195, a high-quality lossy compressed data stream 120 may be perceived as a low-quality audible signal by a user of the destination communication device 110. As a result, unnecessary bandwidth is used communicating the data stream 120 when a lower quality, lower bit rate data stream 120 would be perceived as providing equivalent audio and/or video quality.

The embodiments described herein determine the ambient interference level of the ambient interference 195 and modify the bit rate of the lossy compressed data stream 120 in response to the ambient interference level as will be described hereafter. As a result, unnecessary bandwidth is not used by the data stream 120. However, the reduction of the perceived quality of the audio and/or video at the destination communication device 110 may not be noticeable to the user or may be acceptable to the user.

Figure 1B:
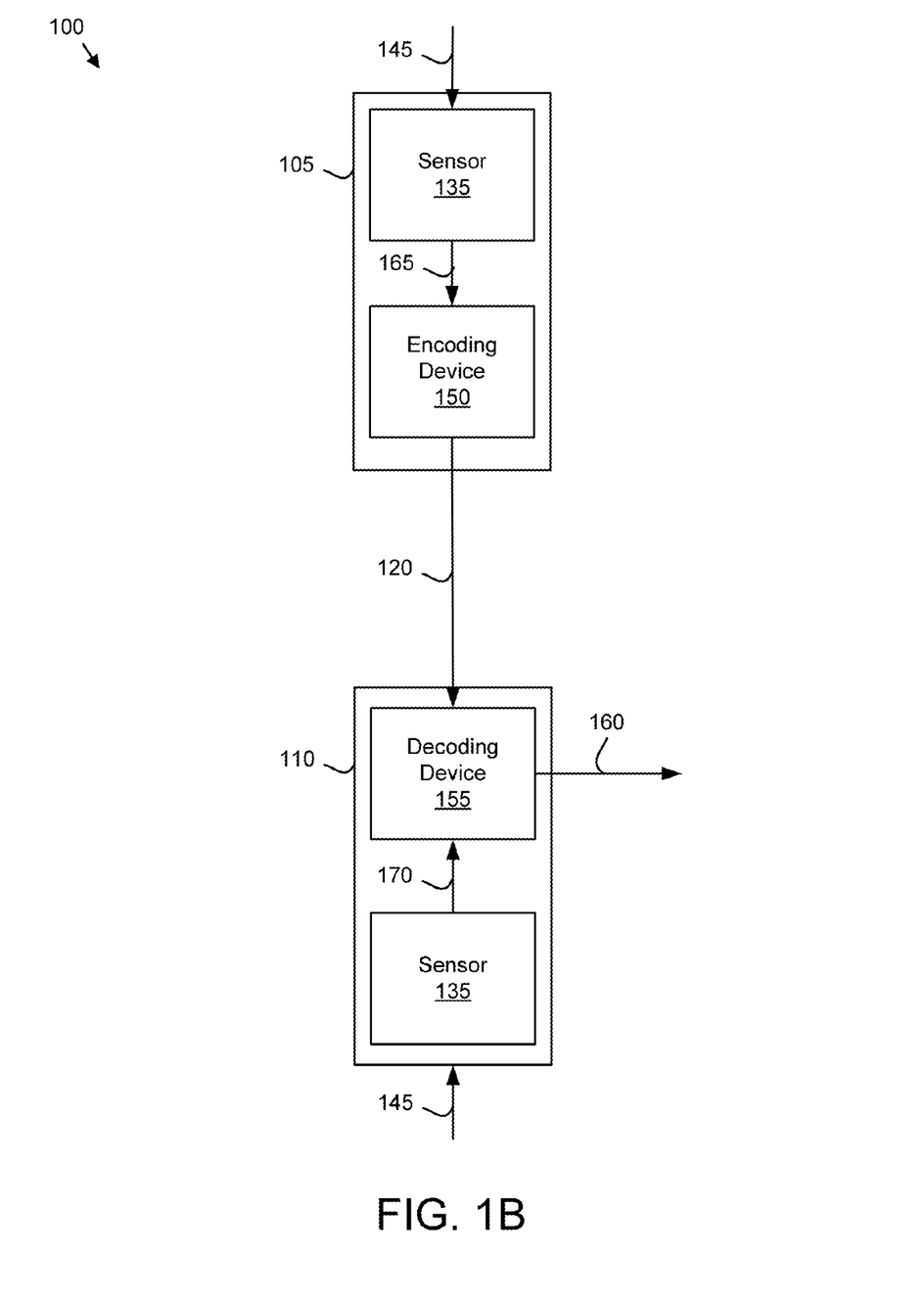
FIG. 1B is a schematic block diagram illustrating one alternate embodiment of a communication system.

FIG. 1B is a schematic block diagram illustrating one alternate embodiment of the communication system 100. The source communication device 105 is depicted communicating the data stream 120 to the destination communication device 110. For simplicity, the network 115 is not shown.

The source communication device 105 includes a sensor 135 and an encoding device 150. The sensor 135 may be a microphone, video camera, an accelerator, or combinations thereof. The encoding device 150 may include a processor and/or encoding hardware.

The sensor 135 receives an input 145. The input 145 may be an audible signal, an image signal, or combinations thereof. The sensor 135 of the source communication device 105 may generate a data signal 165 from the input 145. The data signal 165 may comprise an audio signal, a video signal, or combinations thereof.

The encoding device 150 encodes the data signal 165 as the lossy compressed data stream 120. The bandwidth consumed by the data stream 120 is dependant on the bit rate selected by the encoding device 150.

The destination communication device 110 includes a sensor 135 and a decoding device 155. The sensor 135 of the destination communication device 110 may also receive an input 145. The input 145 may be an audible signal, an image signal, or combinations thereof. The decoding device 155 may decode the lossy compressed data stream 120 to generate an output signal 160. The output signal 160 may be an audible signal, an image signal, or combinations thereof.

The sensors 135 at the source communication device 105 and/or the destination communication device 110 determine the ambient interference level of the ambient interference 195 for the source communication device 105 and/or the destination communication device 110. The encoding device 150 may modify the bit rate of the data stream 120 in response to the ambient interference level of the ambient interference 195 at the source communication device 105, the destination communication device 110, or combinations thereof as will be described hereafter.

For example, the bit rate of the data stream 120 may be adjusted in response to the ambient interference level detected by the sensor 135 of the source communication device 105. Alternatively, the bit rate of the data stream 120 may be adjusted in response to the ambient interference level detected by the sensor 135 of the destination communication device 105.

Figure 1C:
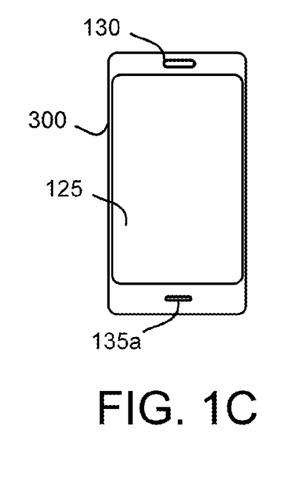
FIG. 1C is a front view drawing illustrating one embodiment of a communication device.

FIG. 1C is a front view drawing illustrating one embodiment of a communication device 300. The communication device 300 may be the source communication device 105 or the destination communication device 110. In the depicted embodiment, the communication device 300 is a mobile telephone. Alternatively, the communication device 300 may be a tablet computer, a laptop computer, a computer workstation, or the like. In the depicted embodiment, the communication device 300 includes a display 125 and a speaker 130.

The communication device 300 includes a microphone sensor 135a. A display 125 may display a video signal as an image signal. A speaker 130 may broadcast an audio signal as an audible signal. The microphone sensor 135a may receive an audible signal and convert the audible signal into an audio data signal 165.

Figure 1D:
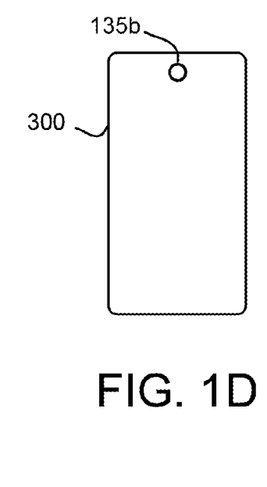
FIG. 1D is a back view drawing illustrating one embodiment of a communication device.

FIG. 1D is a back view drawing illustrating one embodiment of the communication device 300 of FIG. 1C. The communication device 300 includes a camera sensor 135b. The camera sensor 135b may receive an image signal and convert the image signal into a video data signal 165.

Figure 2A:
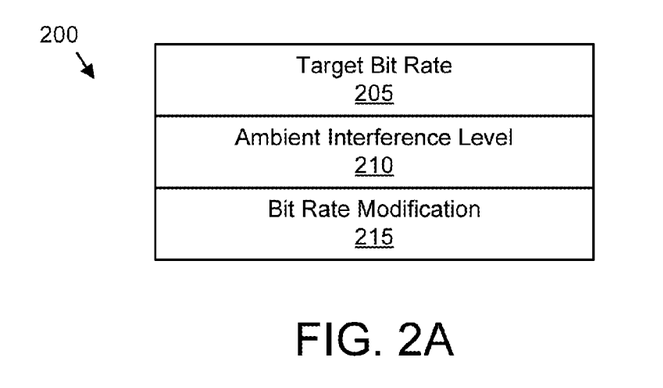
FIG. 2A is a schematic block diagram illustrating one embodiment of bit rate data.

FIG. 2A is a schematic block diagram illustrating one embodiment of bit rate data 200. The bit rate data 200 may be organized as a data structure and stored in a memory. The bit rate data 200 may be stored in a memory of the source communication device 105, the destination communication device 110, or combinations thereof. In the depicted embodiment, the bit rate data 200 includes a target bit rate 205, an ambient interference level 210, and a bit rate modification 215.

The target bit rate 205 may be a desired bit rate for the data stream 120. The target bit rate 205 may be specified by a user. Alternatively, the target bit rate 205 may be calculated as a function of the bandwidth available from the network 115.

The ambient interference level 210 may be calculated as a function of the ambient interference 195 at the source communication device 105, the destination communication device 110, or combinations thereof. In one embodiment, the ambient interference level 210 is calculated as a function of an intensity of the ambient interference 195 and a variability of the ambient interference 195.

The ambient interference level 210 may be a single scalar value. Alternatively, the ambient interference level 210 may be a vector with components for background audio noise, background audio noise for a plurality of audio frequency bands, background light, source communication device motion, and destination communication device motion.

The bit rate modification 215 may specify a change of the bit rate for the data stream 120 relative to the target bit rate 205. Alternatively, the bit rate modification 215 may be an absolute bit rate for the data stream 120. The bit rate modification 215 may be calculated in response to the ambient interference level 210 as will be described hereafter.

Figure 2B:
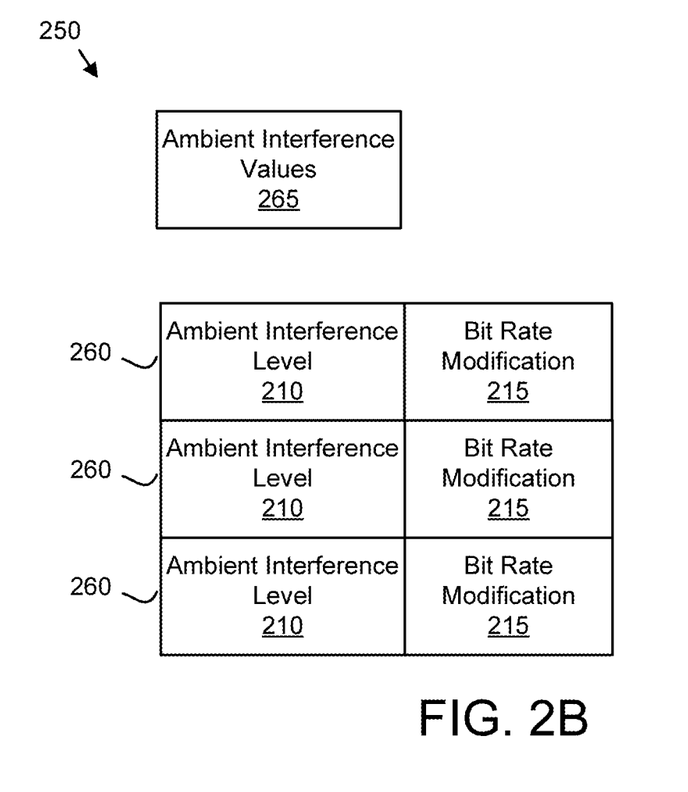
FIG. 2B is a schematic block diagram illustrating one embodiment of a bit rate modification table.

FIG. 2B is a schematic block diagram illustrating one embodiment of a bit rate modification table 250. The bit rate modification table 250 may be organized as a data structure and stored in the memory. The bit rate modification table 250 may be stored in the memory of the source communication device 105, the destination communication device 110, or combinations thereof. The bit rate modification table 250 includes ambient interference values 265 and one or more entries 260. Each entry 260 may include an ambient interference level 210 and a bit rate modification 215.

The ambient interference values 265 may include values for one or more inputs 145 from the sensors 135 of the source communication device 105 and/or the destination communication device 110. The ambient interference values 265 may include a background audio noise value, a background audio noise value for each of a plurality of audio frequency bands, a background light value, a source communication device motion value, and a destination communication device motion value.

An ambient interference level 210 may be calculated from the ambient interference values 265. The ambient interference level 210 may be used as an index to select the corresponding bit rate modification 215.

Figure 3:
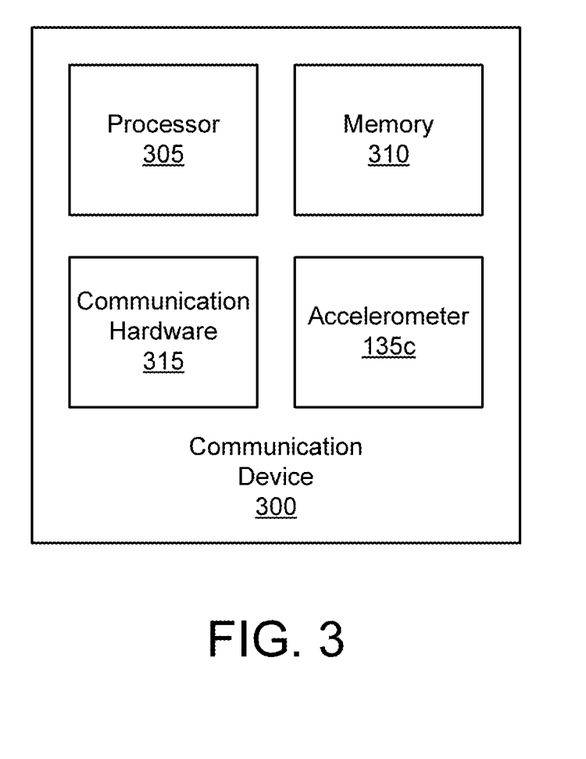
FIG. 3 is a schematic block diagram illustrating one embodiment of a communication device.

FIG. 3 is a schematic block diagram illustrating one embodiment of the communication device 300. The communication device 300 may be a mobile telephone, a tablet computer, a laptop computer, a computer workstation, a wearable computer, or the like. The communication device 300 may communicate with other devices through the network 115. The communication device 300 includes a processor 305, a memory 310, and communication hardware 315. In addition, the communication device 300 may include an accelerometer 135c. The memory 310 may be a semiconductor storage device, a hard disk drive, an optical storage device, a micromechanical storage device, or combinations thereof. The memory 310 may store program code. The processor 305 may execute the program code. The communication hardware 315 may communicate with other devices such as the network 115.

The accelerometer 135c may detect accelerations of the communication device 300. The accelerometer 135c may be used to determine angular and/or linear motions of the communication device 300.

Figure 4:
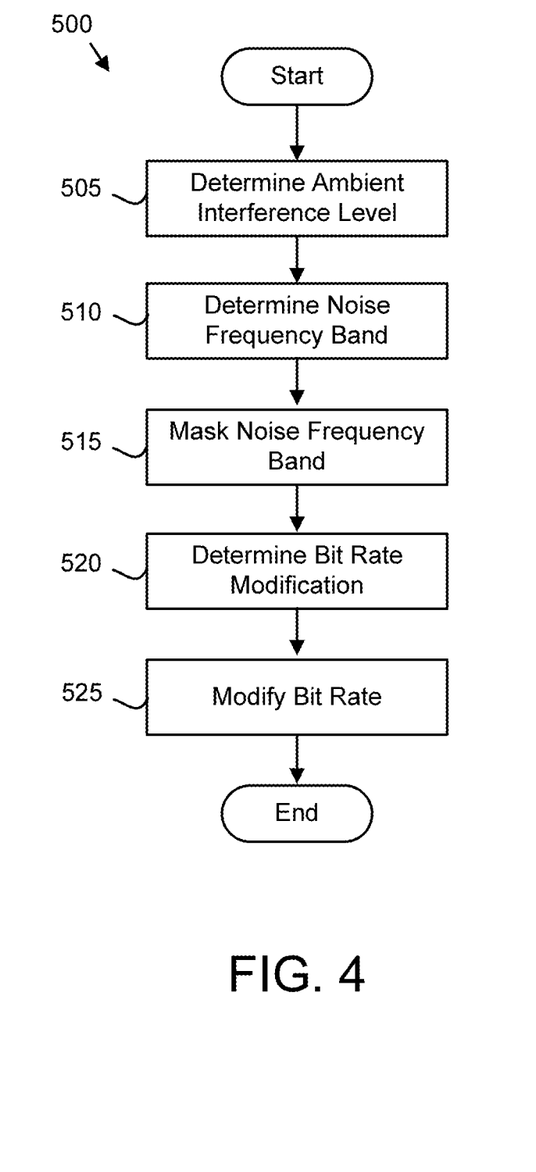
FIG. 4 is a schematic flow chart diagram illustrating one embodiment of a bit rate modification method.

FIG. 4 is a schematic flow chart diagram illustrating one embodiment of a bit rate modification method 500. The method 500 may modify the bit rate of the data stream 120 in response to the ambient interference level 210 of the ambient interference 195. The method 500 may be performed by the processor 305. Alternatively, the method 500 may be performed by a computer readable storage medium such as the memory 310. The computer readable storage medium may store program code that is executed by the processor 305 to perform the method 500.

The method 500 starts, and in one embodiment, the encoding device 150 determines 505 the ambient interference level 210. In one embodiment, the encoding device 150 receives ambient interference values 265 for the ambient interference 195 from the sensors 135 of the source communication device 105, the destination communication device 110, or combinations thereof. The encoding device 150 may further determine 505 the ambient interference level 210 from the ambient interference values 265.

The ambient interference level 210 may be determined 505 from audio interference. In one embodiment, the ambient interference level IL 210 is calculated using Equation 1, where BA is a background audio noise value and k1 is a nonzero constant.

$$IL=k1*BA \qquad \text{Equation 1}$$

Alternatively, the ambient interference level IL 210 may be determined 505 using Equation 2, where LS is a standard deviation of an ambient light ambient interference value relative to the specified light mean value and k2 is a nonzero constant.

$$IL=k2*LS \qquad \text{Equation 2}$$

In one embodiment, the ambient interference level 210 is determined 505 from motion of a video image input 145. The ambient interference level IL 210 may be calculated using Equation 3, where AV is an angular velocity of the source communication device 105, the destination communication device 110, or combinations thereof and k3 is a nonzero constant.

$$IL=k3*AV \qquad \text{Equation 3}$$

Alternatively, the ambient interference level IL 210 may be determined 505 from a change of a pixel object in the video image input 145. For example, the ambient interference level IL 210 may be calculated using Equation 4, where PD is a pixel displacement of a pixel object in the video image input 145 during a displacement time interval. For example, the pixel object may be displaced by 15 pixels in 100 milliseconds.

$$IL=k4*PD \qquad \text{Equation 4}$$

The ambient interference level IL 210 may also be determined 505 as a function of the intensity of the ambient interference 195 and the variability of the ambient interference. For example, the ambient interference level IL 210 may be calculated using Equation 5, where II is the intensity of an ambient interference level IL 210 and VI is the variability of the ambient interference level IL 210 for i iterations of ambient interference measurements.

$$IL=(\Sigma II*VI)/i \qquad \text{Equation 5}$$

In one embodiment, the ambient interference level IL 210 is determined 505 using equation 6.

$$IL=(k1*BA)+(k2*LS)+(k3*AV)+(k4*PD) \qquad \text{Equation 6}$$

The ambient interference level 210 may be determined 505 at a data stream destination such as the destination communication device 110, a data stream source such as the source communication device 105, or combinations thereof.

The encoding device 150 may also determine 510 a noise frequency band of the audio interference. For example, the audio spectrum may be divided into a plurality of noise frequency bands. An ambient interference level 210 may be calculated for each noise frequency band. The noise frequency bands are described in greater detail in FIG. 5A.

In one embodiment, the encoding device 150 masks 515 a noise frequency band of the audio interference. The noise frequency band may be masked in response to the ambient interference level 210 for the noise frequency band exceeding a band threshold. The encoding device 150 may remove the audio interference in the noise frequency band to modify the bit rate of the data stream 120 as will be illustrated in FIG. 5B.

The encoding device 150, decoding device 155, or combinations thereof may determine 520 a bit rate modification 215 in response to the ambient interference level 210. The encoding device 150, decoding device 155, or combinations thereof may employ the bit rate modification table 250 to determine 520 the bit rate modification 215. Alternatively, the encoding device 150, decoding device 155, or combinations thereof may calculate the bit rate modification 215 as a function of the ambient interference level 210.

The bit rate may further be modified 525 in response to the bit rate modification 215 and the method 500 ends. The bit rate may be modified 525 by selecting the compression algorithm with a reduced bit rate. Alternatively, the bit rate may be modified 525 by selecting the compression algorithm parameter that results in a reduced bit rate.

In one embodiment, the decoding device 155 directs that the bit rate be modified from the data stream destination. Alternatively, the encoding device 150 may direct that the bit rate be modified from the data stream source. The bit rate may be modified 525 according to the bit rate modification table 250.

The bit rate may be modified 525 by being reduced in response to an audio ambient interference level 210 exceeding an audio threshold. For example, the audio threshold may be 90 decibels and the bit rate may be reduced in response to an audio ambient interference level 210 of 95 decibels.

In one embodiment, the bit rate is reduced in response to ambient light ambient interference level 210 exceeding a light threshold. For example, the light threshold may be 500,000 lumens and an ambient light ambient interference 210 of 700,000 lumens may exceed the light threshold.

Alternatively, the bit rate is reduced in response to a motion ambient interference level 210 exceeding a motion threshold. For example, the motion threshold may be 0.5 radians per second and a motion ambient interference level of 0.6 radians per second may exceed the motion threshold.

In one embodiment, the bit rate is modified 525 from a reduced bit rate to the target bit rate 205 if the ambient interference level 210 does not exceed any of the audio threshold, the light threshold, and/or the motion threshold.

Figure 5A:
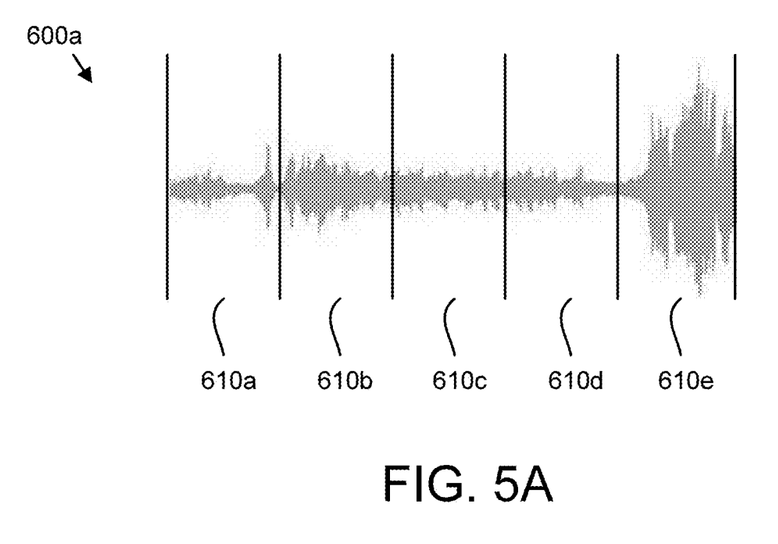
FIG. 5A is a waveform drawing illustrating one embodiment of noise frequency bands.

FIG. 5A is a waveform drawing illustrating one embodiment of noise frequency bands 610 for a waveform 600a of an audio input 145. The waveform 600a is divided into a plurality of noise frequency bands 610. The waveform 600a may include both an audio signal and audio ambient interference 195. The encoding device 150 may detect a noise frequency band 610 with excessive noise. In one embodiment, the ambient interference level 210 of the noise frequency band 610 exceeds the band threshold. The band threshold may be measured in decibels.

Figure 5B:
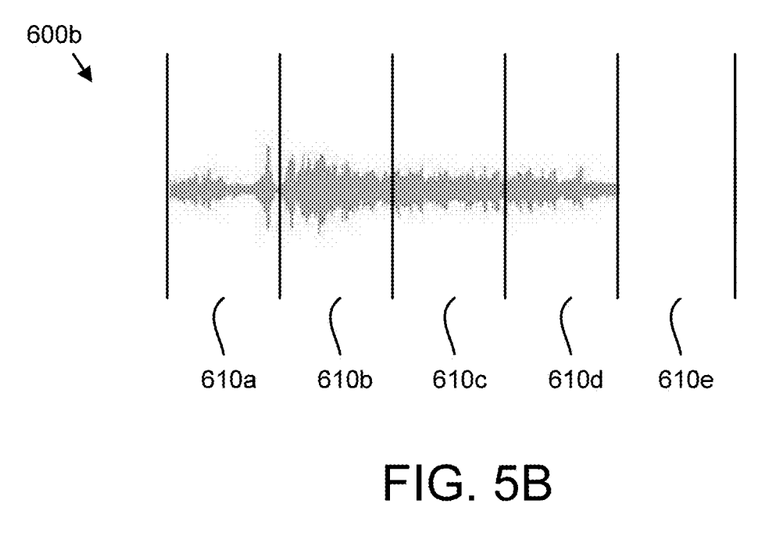
FIG. 5B is a waveform drawing illustrating one embodiment of filtered noise frequency bands.

FIG. 5B is a waveform drawing illustrating one embodiment of filtered noise frequency bands 610 for the waveform 600a of FIG. 5A. The waveform 600b is depicted with a fifth noise frequency band 610e masked to reduce the bit rate of the data stream 120.

The embodiments determine the ambient interference level 210 of the ambient interference 195 at the source communication device 105, the destination communication device 110, or combinations thereof. In addition, the embodiments modify the bit rate of the lossy compressed data stream 120 in response to the ambient interference level 210. As a result, the bandwidth requirement for the data stream 120 may be reduced with a minimal change to the quality of the output signal 160 for the user of the destination communication device 110.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a communication device comprising a processor and a memory that stores code executable by the processor to:
determine an ambient interference level of ambient interference at one or more of a data stream source and a data stream destination;
determine a bit rate modification by using the ambient interference level as an index to select the bit rate modification from a bit rate modification table; and
modify a bit rate of a lossy compressed data stream communicated from the data stream source to the data stream destination with the bit rate modification.

2. The apparatus of claim 1, wherein the ambient interference is audio interference.

3. The apparatus of claim 1, wherein the ambient interference is ambient light.

4. The apparatus of claim 1, wherein the ambient interference is motion of a video image.

5. A method comprising:
determining, by use of a processor, an ambient interference level of ambient interference at one or more of a data stream source and a data stream destination;
determining a bit rate modification by using the ambient interference level as an index to select the bit rate modification from a bit rate modification table; and
modifying a bit rate of a lossy compressed data stream communicated from the data stream source to the data stream destination with the bit rate modification.

6. The method of claim 5, wherein the ambient interference is audio interference.

7. The method of claim 6, wherein the bit rate is further modified by masking a noise frequency band in the data stream in response to an audio ambient interference level of the noise frequency band exceeding a band threshold.

8. The method of claim 5, wherein the ambient interference is ambient light.

9. The method of claim 5, wherein the ambient interference is motion of a video image.

10. The method of claim 5, wherein the ambient interference level is a function of an intensity of the ambient interference and a variability of the ambient interference.

11. The method of claim 5, wherein the ambient interference level is determined at a data stream destination.

12. The method of claim 5, wherein the ambient interference level is determined at a data stream source.

13. The method of claim 5, wherein the bit rate is modified from the data stream destination.

14. The method of claim 5, wherein the bit rate is modified from the data stream source.

15. A program product comprising a non-transitory computer readable storage medium that stores code executable by a processor, the executable code comprising code to perform:
   determining an ambient interference level of ambient interference at one or more of a data stream source and a data stream destination;
   determining a bit rate modification by using the ambient interference level as an index to select the bit rate modification from a bit rate modification table; and
   modifying a bit rate of a lossy compressed data stream communicated from the data stream source to the data stream destination with the bit rate modification.

16. The program product of claim 15, wherein the ambient interference is audio interference.

17. The program product of claim 15, wherein the ambient interference is ambient light.

18. The program product of claim 15, wherein the ambient interference is motion of a video image.

\* \* \* \* \*